(12) United States Patent
Suzuki

(10) Patent No.: US 9,024,568 B2
(45) Date of Patent: May 5, 2015

(54) MOTOR SPEED CONTROLLER AND CONTROL METHOD

(75) Inventor: Haruyuki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 144 days.

(21) Appl. No.: 13/477,256

(22) Filed: May 22, 2012

(65) Prior Publication Data

US 2012/0306419 A1 Dec. 6, 2012

(30) Foreign Application Priority Data

Jun. 2, 2011 (JP) ................................. 2011-124191

(51) Int. Cl.
*H02P 23/00* (2006.01)
*H02P 27/00* (2006.01)

(52) U.S. Cl.
CPC .................................. *H02P 23/0068* (2013.01)

(58) Field of Classification Search
None
See application file for complete search history.

(56) References Cited

U.S. PATENT DOCUMENTS

| | | | | |
|---|---|---|---|---|
| 4,215,378 A * | 7/1980 | Sato et al. ..................... | 360/74.1 |
| 4,250,435 A * | 2/1981 | Alley et al. ............... | 318/400.03 |
| 4,400,192 A * | 8/1983 | Farkas ........................... | 65/29.1 |
| 4,564,794 A * | 1/1986 | Kilen et al. ................... | 388/813 |
| 4,805,155 A * | 2/1989 | Shiraishi et al. ................. | 367/7 |
| 4,963,808 A * | 10/1990 | Torisawa et al. ............. | 318/685 |
| 5,424,763 A * | 6/1995 | Komiya et al. ............... | 347/116 |
| 5,557,184 A * | 9/1996 | Hwang ........................ | 318/608 |
| 5,760,357 A * | 6/1998 | Nakamura et al. .......... | 200/33 B |
| 5,760,359 A * | 6/1998 | Nakano et al. ............... | 318/603 |
| 6,130,577 A * | 10/2000 | Tamba et al. ................. | 329/304 |
| 6,208,092 B1 * | 3/2001 | Kim .............................. | 315/370 |
| 6,812,667 B2 * | 11/2004 | Yasohara et al. ............. | 318/599 |
| 8,615,064 B2 * | 12/2013 | Sai ................................ | 375/376 |
| 2003/0016965 A1 | 1/2003 | Matsumoto | |
| 2004/0160265 A1 * | 8/2004 | Fiedler ......................... | 327/355 |
| 2005/0046363 A1 * | 3/2005 | Yamamoto ................... | 318/114 |
| 2005/0225275 A1 * | 10/2005 | Eskritt et al. ................. | 318/437 |
| 2005/0280379 A1 * | 12/2005 | Takayama et al. ............ | 318/109 |
| 2006/0044664 A1 * | 3/2006 | Itagaki et al. .............. | 360/73.03 |

(Continued)

FOREIGN PATENT DOCUMENTS

JP 63-080788 4/1988
JP 04-000288 1/1992

(Continued)

OTHER PUBLICATIONS

JP-2005521322 and JP 4377696 correspond to WO 03081779.
Japan Patent Office Action dated Dec. 16, 2014.

*Primary Examiner* — Eduardo Colon Santana
*Assistant Examiner* — Devon Joseph
(74) *Attorney, Agent, or Firm* — Harness, Dickey & Pierce, P.L.C.

(57) ABSTRACT

A motor speed controller controls a motor speed to generate a phase reference pulse; generates a FG pulse per rotary angle of the motor; detects a difference between the number of phase reference pulses and the number of FG pulses for output as an integer number phase difference; detects and measures a time difference between an edge of the phase-reference pulse and an edge of the FG pulse in units of the reference clock for output as a decimal fraction phase difference; adds the integer number phase difference to the decimal fraction phase difference at a predetermined ratio for output as a phase difference; and controls driving of the motor in accordance with the phase difference.

10 Claims, 6 Drawing Sheets

(56) References Cited

U.S. PATENT DOCUMENTS

2006/0206551 A1* 9/2006 Grushin .................. 708/270
2008/0013665 A1* 1/2008 Werker et al. ............ 375/376
2009/0134824 A1* 5/2009 Hristov et al. ........ 318/400.19
2010/0253267 A1* 10/2010 Kitanaka ............... 318/400.26
2010/0308760 A1* 12/2010 Nakamura ............. 318/400.11
2011/0169442 A1* 7/2011 Birumachi ................. 318/696
2013/0257338 A1* 10/2013 Inoue et al. ................ 318/561

FOREIGN PATENT DOCUMENTS

| | | |
|---|---|---|
| JP | 05-103489 | 4/1993 |
| JP | 09247999 A | 9/1997 |
| JP | 2003-29492 | 1/2003 |
| JP | 2005521322 A | 7/2005 |
| JP | 4377696 B2 | 9/2009 |
| JP | 2011061929 A | 3/2011 |
| WO | WO-03081779 A1 | 10/2003 |

* cited by examiner

MOTOR SPEED CONTROLLER AND CONTROL METHOD

CROSS-REFERENCE TO RELATED APPLICATION

This patent application is based on and claims priority pursuant to 35 U.S.C. §119 to Japanese Patent Application No. 2011-124191, filed on Jun. 2, 2011 in the Japan Patent Office, the entire disclosure of which is hereby incorporated by reference herein.

FIELD OF THE INVENTION

1. Technical Field

The present disclosure relates to a motor speed controller and a control method for controlling speed of a motor, and more specifically to a motor speed controller that controls rotational speed of a motor using phase-locked loop.

2. Description of the Related Art

In electrical circuits, a phase-locked loop (PLL) control technique is widely known. In PLL control, phases are synchronized by detecting a phase difference between an output pulse from a voltage control oscillator (VCO) that oscillates at a frequency proportional to an externally applied control voltage and a pulse having a reference frequency and by feeding back the detected phase difference to the VCO.

On the other hand, a technique is known in which, by applying a predetermined drive voltage, a DC motor rotates at a speed proportional to the drive voltage (motor drive voltage). In addition, a technique is known in which a rotary encoder is provided on a rotary shaft of the DC motor to generate an encoder pulse that is a so-called FG pulse (function generator pulse or a frequency generator pulse).

Based on these techniques, a configuration from the motor drive voltage to the FG pulse is used to resemble the VCO. More specifically, by detecting a motor speed (number of rotations) by the FG pulse using PLL control, the motor drive voltage is controlled using PLL control so that the FG pulse is synchronized with a predetermined reference clock.

In any type of PLL control, a phase difference detector (phase comparator) outputs a linear value of the phase difference when a phase difference is within 1 pulse cycle (360 or $2\pi$ radians). However, when the phase difference exceeds the range, the value of the phase difference reverses and the phases get out of sync.

In motor control, when an unexpected fluctuation in load and change in target speed occur, the phase difference is transitionally increased and can exceed 1 pulse cycle. When this happens, the phases get out of sync and it requires time to get back in sync. However, although in sync again, position deviation over 1 pulse phase remains as is and is not corrected.

In order to prevent the phases from getting out of sync, a phase difference between the number of reference pulses and the number of FG pulses is used as a phase difference detector. With this configuration, the phase difference is detected in units of the number of pulses. Accordingly, if the phase difference exceeds 1 pulse phase, the phase difference can be detected in perspective, and the position deviation does not occur.

However, in this control, resolution is in pulse units, which is very rough. The phase difference cannot be detected when the phase is within 1 pulse, which is not suitable for precision control.

JP-4377696-B discloses a device in which a phase of the VCO (controlled digitally) is output as an integer phase and a decimal fraction, and both the integer and the decimal fraction are used for detecting a phase difference.

In this example, when the driving target is digital VCO, the decimal fraction can be output. However, when the motor (analog target) is used, since a detector is formed by only the FG pulse, the amount of phase that is shorter than the FG pulse cycle cannot be output as is.

Alternatively, JP-H09-247999-A discloses a variable speed driving device in which an integer phase form is expressed by the number of encoder (FG) pulses counted by a phase counter, and a phase component containing a decimal fraction is obtained by measuring speed by measuring an encoder cycle with a clock.

However, this example does not disclose a phase difference detector to detect a phase difference between a reference pulse having a reference frequency needed for PLL control and in an interval of the FG pulse for output in units as small as decimal fractions.

SUMMARY

In one aspect of this disclosure, there is provided a motor speed controller to control a motor speed, including a reference clock generator, a phase reference pulse generator, an encoder, an edge detector, an integer phase difference detector, a decimal fraction phase difference detector, a mixer, and a controller. The reference clock generator generates a reference clock based on a reference frequency signal. The phase reference pulse generator divides frequency of the reference clock by a dividing ratio N for output as a phase-reference pulse. The encoder outputs a frequency generator (FG) signal at a predetermined rotational angle. The edge detector detects an edge of the FG signal for output as a FG pulse. The integer phase difference detector detects a difference between the number of phase-reference pulses and the number of FG pulses for output as an integer phase difference. The decimal fraction phase difference detector detects a time difference between an edge of the phase-reference pulse and the edge of the FG edge pulse in units of the reference clock for output as a decimal fraction phase difference. The mixer adds the integer phase difference to the decimal fraction phase difference at a predetermined ratio for output as a phase difference. The controller controls driving of the motor based on the phase difference output from the mixer.

In another aspect of this disclosure, there is provided a control method for the motor speed controller including generating a phase-reference pulse; generating a FG pulse per rotary angle of the motor; detecting a difference between the number of phase-reference pulses and the number of FG pulses as an integer number phase difference; detecting a time difference between an edge of the phase-reference pulse and an edge of the FG pulse in units of the reference clock for output as a decimal fraction phase difference; adding the integer number phase difference to the decimal fraction phase difference for output as a phase difference; and controlling driving of the motor in accordance with the phase difference.

BRIEF DESCRIPTION OF THE DRAWINGS

The aforementioned and other aspects, features, and advantages will be better understood by reference to the following detailed description when considered in connection with the accompanying drawings, wherein.

DETAILED DESCRIPTION OF PREFERRED EMBODIMENTS

Figure 1:
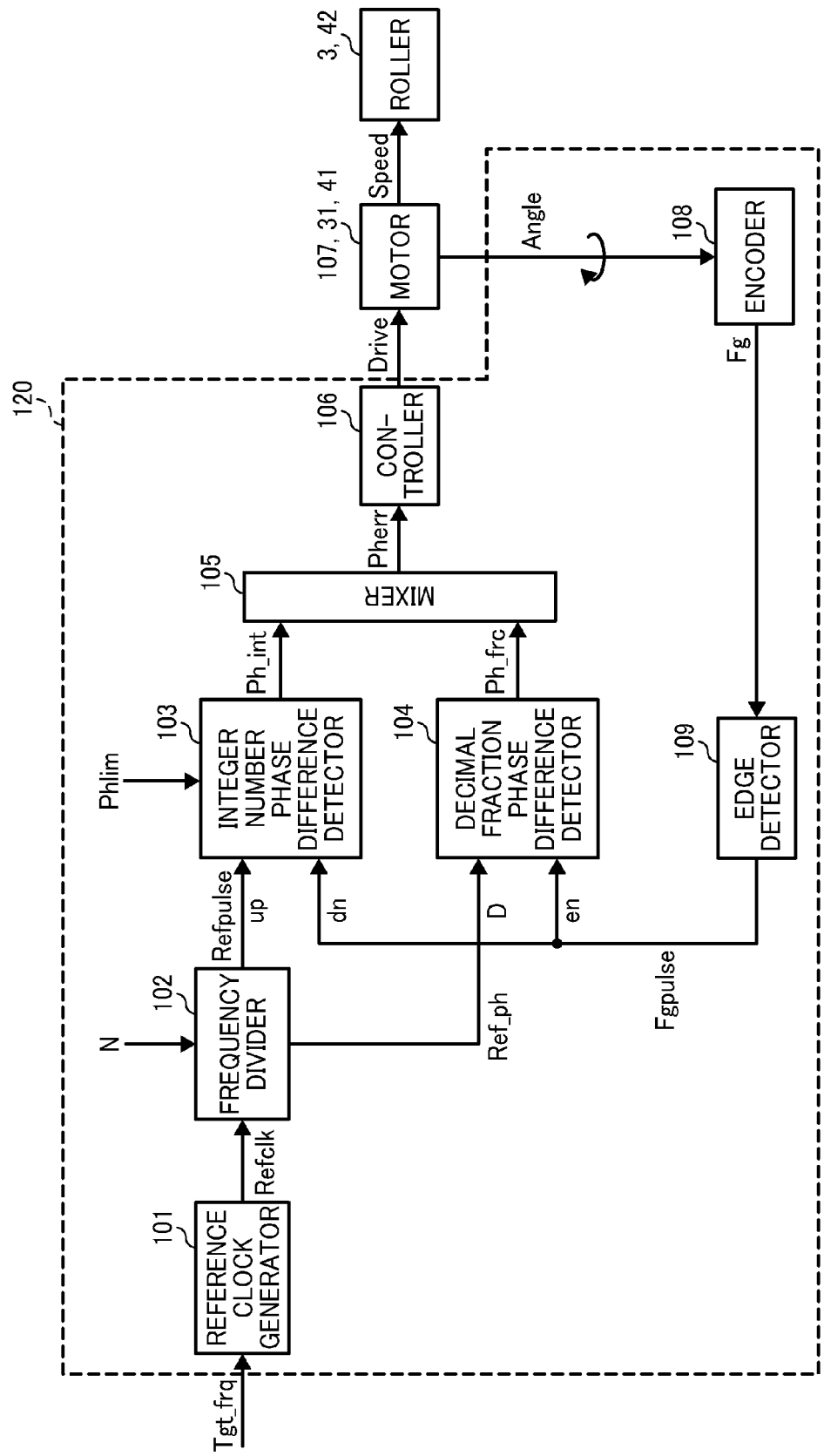
FIG. 1 is a block diagram illustrating a configuration of a motor speed controller connected to a motor according to a first embodiment of the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, particularly to FIGS. 1 through 10, motor speed controllers according to illustrative embodiments are described.

FIG. 1 is a block diagram illustrating a configuration of a motor speed controller 120 connected to a motor 107.

The motor speed controller 120 includes a reference clock generator 101, a phase-reference pulse generator (frequency divider) 102, an encoder 108, an edge detector 109, an integer phase difference detector 103, a decimal fraction phase difference detector 104, a mixer 105, and a controller 106. The reference clock generator 101 generates a reference clock Refclk based on a reference frequency Tgt_frq. The frequency divider 102 divides the reference clock Refclk at a dividing ratio N for output as a phase-reference pulse Refpulse. The encoder 108 outputs a frequency generator (FG) signal Fg by a predetermined rotational angle. The edge detector 109 detects an edge of the FG signal Fg for output as a FG pulse Fgpulse. The integer phase difference detector 103 detects a difference between the number of phase-reference pulses Refpulse and the number of FG pulses Fgpulse for output as an integer phase difference Ph_int. The decimal fraction phase difference detector 104 detects a time difference between an edge of the phase-reference pulse Refpulse and the edge of the FG (edge) pulse Fgpulse in units of the reference clock Refclk for output as a decimal fraction phase difference Ph_frc. The mixer 105 adds the integer phase difference Ph_int to decimal fraction phase difference Ph_frc at a predetermined ratio for output as a phase difference Pherr. The controller 106 controls driving of the motor 107 based on the phase difference Pherr.

The motor speed controller of present disclosure can be adapted to various types of image forming apparatuses, such as copiers, facsimile machines, multifunction peripherals (MFP), and the like.

In FIG. 1, the reference clock generator 101 generates the reference clock Refclk having a frequency in accordance with a reference frequency (target frequency set value) Tgt_frq.

The N frequency divider 102, serving as the phase-reference pulse generator, divides the reference clock Refclk at a set dividing ratio N to generate the phase-reference pulse Refpulse. Herein, the frequency of reference clock Refclk is N times the frequency of the phase-reference pulse Refpulse. The N frequency divider 102 outputs a reference phase value Ref_ph obtained by the dividing process.

The integer phase difference detector 103 includes an up-down counter (to be described in detail later) to increase the output signal Ph_int as a pulse is input from an input terminal "up" and decrease the output signal Ph_int as a pulse input is input from an input terminal "dn". The phase-reference pulse Refpulse is input to the input terminal up. The FG pulse Fgpulse generated based on the motor 107 is input to the input terminal dn. The output signal Ph_int from the integer phase difference detector 103 indicates the integer phase difference that is a difference between the number of phase-reference pulses Refpulse and the number of FG pulses Fgpulse. When the integer phase difference Ph_int is set to "1", the phase difference is one cycle. The integer phase difference Ph_int is held at the value obtaining when the FG pulse Fgpulse arrives and the count on the counter decreases. (see FIG. 3)

A limit value is set in the integer phase difference detector 103. The integer phase difference detector 103 may include a limiter. Therefore, the integer phase difference detector 103 prevents the integer phase difference Ph_int from becoming greater than a (positive) limit set value "Phlim" and becoming smaller than a negative limit set value −Phlim.

The mixer 105 adds the integer phase difference Ph_int to the decimal fraction phase difference Ph_frc at a predetermined ratio for output as the phase difference Pherr. The controller 106 controls driving of the motor 107 based on the phase difference Pherr.

It is to be noted that, although a pulse difference is obtained by the up-down counter as described above, a difference between the number of phase-reference pulses Refpulse and the number of FG pulses Fgpulse may be obtained by some other way. For example, the respective pulses Refpulse and Fgpulse are summed up counted, and then substrates. However, when the difference is present for two up-counters, setting the phase difference limit is difficult.

In this embodiment, the integer phase difference detector 103 is constituted by the up-down counter, and therefore, the phase difference can be obtained by a single counter, thereby reducing cost.

By setting logic of up-down condition, the phase difference limit can be implemented simply. By setting the limit of counting by logic of the up-down condition in the up-down counter, excessive phase difference can be limited so as not to exceed the limit even when a lot of the phase-reference pulse Refpulse arrive and a few FG pulse Fgpulse arrive, for example, when the motor 107 starts driving. Thus, a time period to converge the phase difference can be shortened.

The decimal fraction phase difference detector 104 holds the reference phase value Ref_ph output from the frequency divider 102 when the FG pulse (pulse edge) Fgpulse from the motor 107 arrives. The holding result "Ph_frc" represents a phase difference of the FG pulse Fgpulse in one cycle of the phase-reference pulse Refpulse, which is called the decimal fraction phase difference Ph_frc. More specifically, the decimal fraction phase difference detector 104 may be implemented as a latch circuit.

It is to be noted that, it is not limited that the decimal fraction phase difference detector 104 is constituted by the latch to latch (hold) the reference phase value Ref_ph in the frequency divider 102 when the FG pulse edge Fgpulse arrives, the decimal fraction phase difference detector 104 may be formed by a device only to measure a time interval from the phase-reference (edge) pulse Refpulse to the FG (edge) pulse Fgpulse.

For example, a counter (to be described later) to count a sufficient high speed of clock is provided, the decimal fraction phase difference detector 104 causes the counter to start at the phase-reference edge pulse Refpulse to stop when the FG edge pulse Fgpulse arrives for holding at the value.

In this embodiment, by latching the reference phase value Ref_ph from the frequency divider 102 when the FG edge pulse Fgpulse arrives the circuit size of the decimal fraction phase difference detector 104 can be minimized because the dividing counter in the reference clock generator 101 can be also used therein, without providing a counter to measure the phase difference, thereby reducing cost.

The mixer 105 adds the integer phase difference Ph_int to the decimal fraction phase difference Ph_frc at the predetermined ratio for output as the phase difference Pherr. For the ratio (additional ratio), it is preferable that the number of the integer phase difference Ph_int be at least greater than the number of decimal fraction phase difference Ph_frc. The phase difference Pherr is obtained by adding the decimal fraction phase difference Ph_frc to N times the integer phase difference Ph_int, setting the adding ratio of to the dividing ratio N of the frequency divider 102. Thus, the integer number and the decimal fraction are added at physically correct ratio, which can obtain continuous phase difference data as the phase difference Pherr.

The addition process in the mixer 105 is obtained by the following formula.

$$Pherr = N \times Ph\_int + Ph\_frc \quad (1)$$

Herein, N represents one cycle of the phase difference. When the phase difference Pherr is set to 1, the value of the phase difference Pherr is set as follows:

$$Pherr = Ph\_int + Ph\_frc/N \quad (2)$$

As is clear from the formulas 1 and 2, the ratio of the integer phase difference Ph_int is as N times large as that of the decimal fraction phase difference Ph_frc. The controller 106 outputs a motor driving amount Drive so that the phase difference Pherr becomes close to 0. In this process, known control theory can be obtained.

In general, in a case in which the speed of the motor 107 is controlled by using the phase difference, the driving amount is obtained by summing up a gain process to provide an output proportional to the phase difference Pherr, and a differentiating process that the phase difference is differentiated.

In any case, the controller 106 drives the motor 107 in accordance with the phase difference Pherr.

The motor 107, constituted by a direct-current (DC) motor, is rotated in accordance with the driving amount Drive. The driving amount Drive may be formed by the amount of applied voltage or the amount of applied current. Alternatively, the driving amount Drive may be formed by a pulse driving, such as pulse width modulation (PWM). The encoder 108 outputs the FG pulse signal Fg by predetermined rotary angles of the motor 107.

In general, resolution is different based on the filed of used application, for example, 50 pulse to approximately 100 pulse per 1 cycle. The edge detector 109 detects rising or/and falling the FG pulse signal Fg for output as the FG edge pulse Fgpulse. As described above, the FG edge pulse Fgpulse is input to the integer phase difference detector 103 and the decimal fraction phase difference detector 104.

With the control in the present configuration, finally, the controller 106 controls so that a phase difference between the phase-reference pulse Refpulse and the FG edge pulse Fgpulse becomes close to 0. Alternatively, when the phase difference is set to a constant value except zero, the frequency of the phase-reference pulse Refpulse becomes equal to that of the FG pulse Fgpulse, which controls the rotary speed of the motor 107 kept constant.

Figure 2:
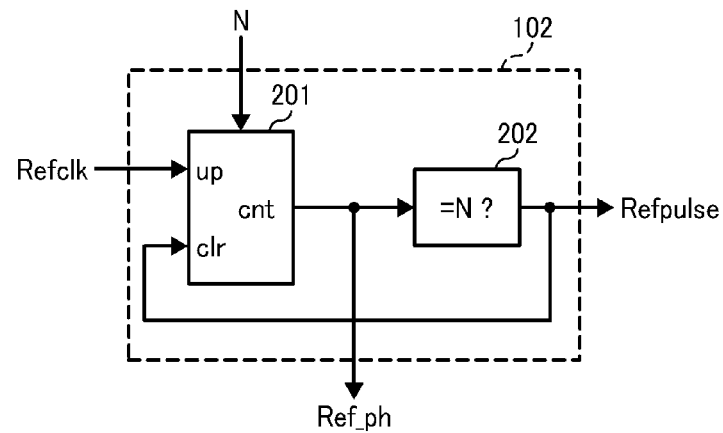
FIG. 2 is a block diagram illustrating a configuration of a frequency divider in the motor speed controller shown in FIG. 1.

FIG. 2 is a block diagram illustrating a configuration of the frequency divider 102. The frequency divider 102 includes a counter 201 and a comparator 202. The counter 201 increases by 1 count one by one with each the reference clock Refclk. The counter 201 outputs the value of count as the reference phase value Ref_ph. The comparator 202 outputs the phase-reference pulse Refpulse when the reference phase value Ref_ph becomes equal to the setting value N. At the same time, the counter 201 is cleared. With this operation, the reference phase value Ref_ph is repeated to gradually rises (ramps) from 0 to N and then sharply drop from N to 0. When the reference phase value Ref_ph drops to 0, the comparator 202 outputs the phase-reference pulse Refpulse.

Figure 3:
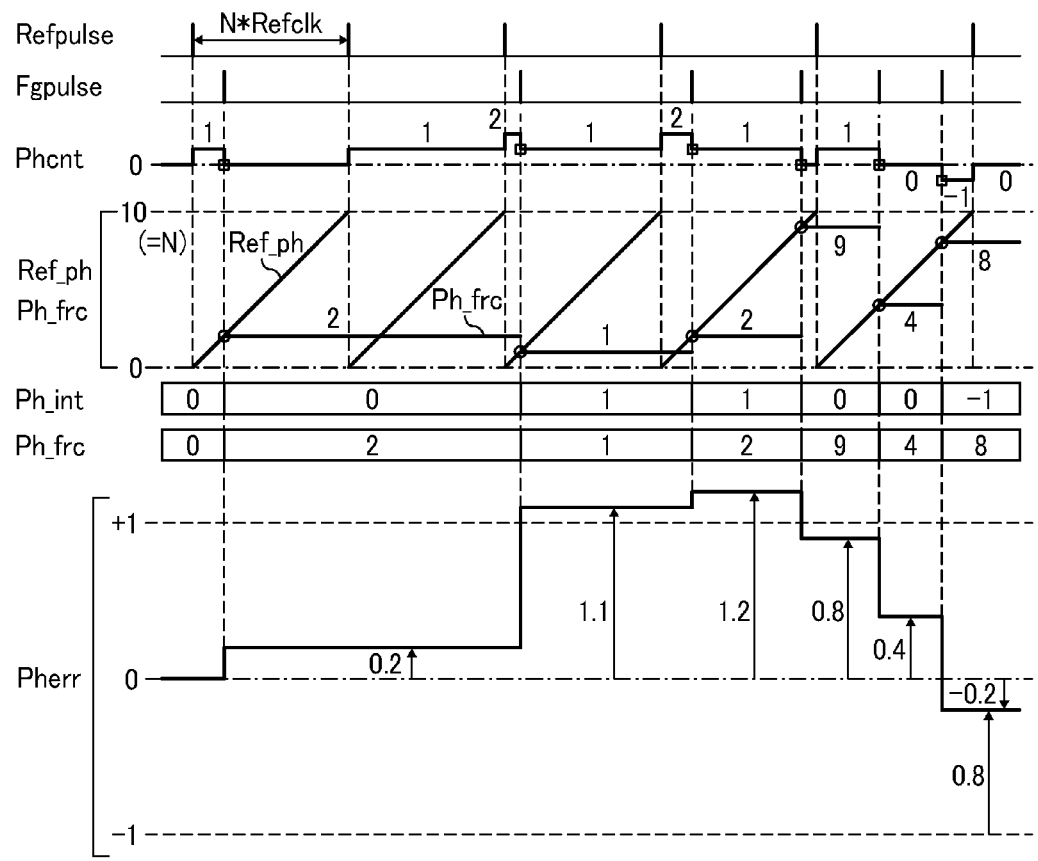
FIG. 3 is a graph illustrating waveforms of a reference clock, a phase-reference pulse, and a reference phase value.

FIG. 3 is a graph illustrating waveforms of the reference clock Refclk, the phase-reference pulse Refpulse, and the reference phase value Ref_ph. Herein, the dividing ratio N from the reference clock Refclk to the phase-reference pulse Refpulse is set to 10. A counter value Phcnt from the up-down counter 201 rises when the phase-reference pulse Refpulse is input and falls when the FG pulse Fgpulse is input. The reference phase value Ref_ph repeats rising 0 to 10 (strictly 0 to 9) during an interval between the phase-reference pulses Refpulse. The decimal fraction phase difference detector 104 latches the value of the reference phase value Ref_ph when the FG pulse Fgpulse arrives, to generate the decimal fraction phase difference Ph_frc. The integer phase difference detector 103 latches the count value Phcnt when the count value Phcn from the up-down counter 201 is decreased by arriving the FG pulse Fgpulse, to generate the integer phase difference Ph_int.

Herein, the phase difference Pherr is obtained by the formula 2.

$$(Pherr = Ph\_int + Ph\_frc/N \quad (2)$$

In this example, initially, the cycle of the phase-reference pulse Refpulse is faster than that of the FG pulse Fgpulse, and therefore, the phase difference Pherr is increased. Then, the FG pulse Fgpulse is faster, and as s result, the phase difference Pherr is decreased.

The phase difference Pherr does not turn down when the phase difference Pherr exceeds 1, the true value containing the decimal fraction can be attained.

Figure 4:
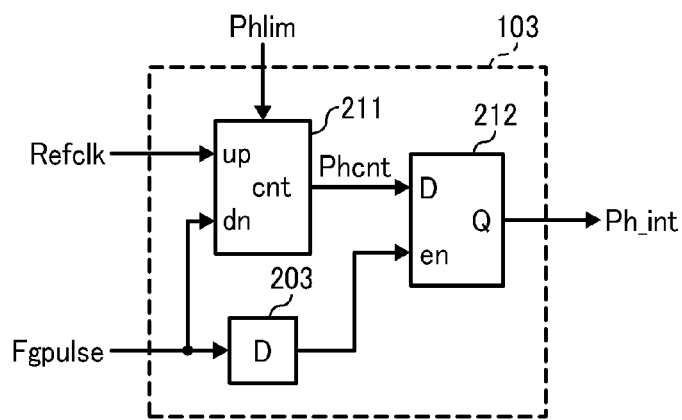
FIG. 4 is a block diagram illustrating a configuration of an integer phase difference detector in the motor speed controller shown in FIG. 1.

FIG. 4 is a block diagram illustrating a configuration of the integer phase difference detector 103. The integer phase difference detector 103 includes the up-down counter 211, a delay device 203, and a latch device 212. The count of the up-down counter 211 rises when the phase-reference pulse Refpulse arrives and falls when the FG pulse Fgpulse arrives. The delay device 203 delays the FG pulse Fgpulse for 1 unit time (for a short time about basic clock, the basic clock signal is not shown).

The latch device 212 holds the count value Phcnt after a delay time set in the delay device 203 has elapsed since the count value Phcnt from the counter 211 is changed based on the FG pulse Fgpulse. That is, the latch device 212 holds the count value Phcnt when the count value Phcnt falls by arriving the FG pulse Fgpulse, for output as the integer phase difference Ph_int.

The count value Phcnt of the counter 211 is limited within positive value and negative value by a setting limit value of phase difference Phlim and −Phlim. That is, the counter 211 operates the count within a range a setting limit value Phlim to −Phlim, and the counter 211 is prevented operating excess the setting values.

For example, the operation logic of the counter 211 may be described as follows.
S1: if (Refpulse && Fgpulse) Phcnt=Phcnt;
S2: else if (Refpulse && (Phcnt<Phlim)) Phcnt=Phcnt+1
S3; else if (Refpulse && (Phcnt>−Phlim)) Phcnt=Phcnt−1;
S4; else Phcnt=Phcnt;
Herein, at S1, the phase-reference pulse Refpulse and the FG pulse Fgpulse are same time, the counter 211 does not count and holds the state. At S2, when the phase-reference pulse Refpulse arrives and the count value Phcnt does not reach the positive limit value Phlim, the counter 211 rises. At S3, when the FG pulse edge Fgpulse arrives and the count value Phcnt does not reach the positive limit value Phlim, the counter 211 falls. At S4 outside of these, when the both pulses Refpulse and Fgpulse do not arrive and the count value Phcnt already reaches the limit value Phlim or −Phlim, the count value Phcnt is held.

It is to be noted that, although the up-down counter 211 increases a count value Phcnt based on the edge of the phase-reference pulse Refpulse and decreases the count value Phcnt based on the edge of the PG pulse Fgpulse, alternatively the up-down counter may decrease the count value based on the edge of the phase-reference pulse Refpulse and increase the count value based on the edge of the PG pulse Fgpulse.

Figure 5:
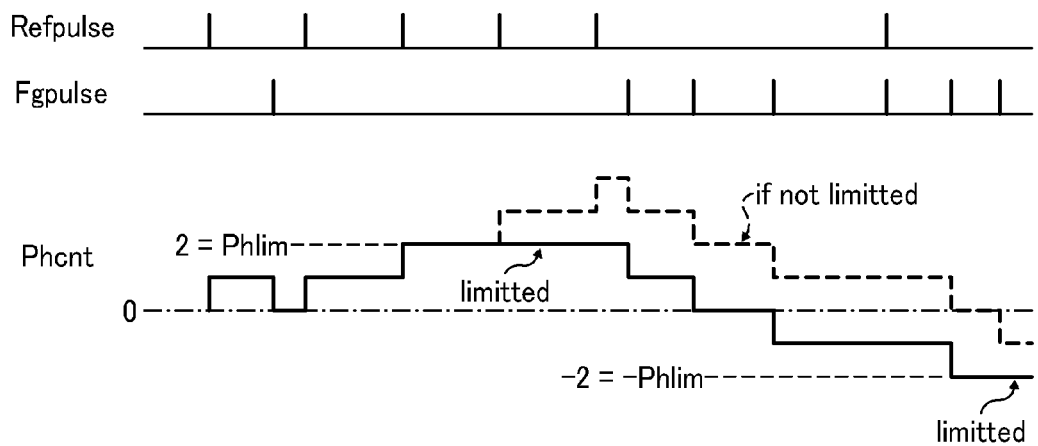
FIG. 5 is a graph illustrating operation waveforms of a count value of a counter in the integer phase difference detector shown in FIG. 5.

FIG. 5 is a graph illustrating operation waveforms of the counter 211. A dashed line indicates the count value Phcnt a case in which the limit value is sufficiently large and the count value Phcnt is not limited. If the count value Phcnt is not limited, the count value Phcnt keeps rising until any of pulse (Fgpulse) arrives, and it takes long time to decrease to zero. This situation means, the phase difference therebetween is very large when the motor 107 starts driving.

In order to return the phase difference after rotation of the motor, a lot of the FG pulse Fgpulse have to arrive in a shorter cycle than the phase-reference pulse Refpulse. That is, a state in which the motor rotates at a speed higher than a target rotational number. As a result, it takes long time to convert (trim) the rotational number.

A solid line indicates the count value Phcnt that is limited from −2 to +2 when the limit value Phlim is set to 2. With this operation, the time period to the count value Phcnt becomes close to 0 is faster, as a result, it takes shorter time to convert (trim) the rotational number after the motor 107 starts driving.

Figure 6:
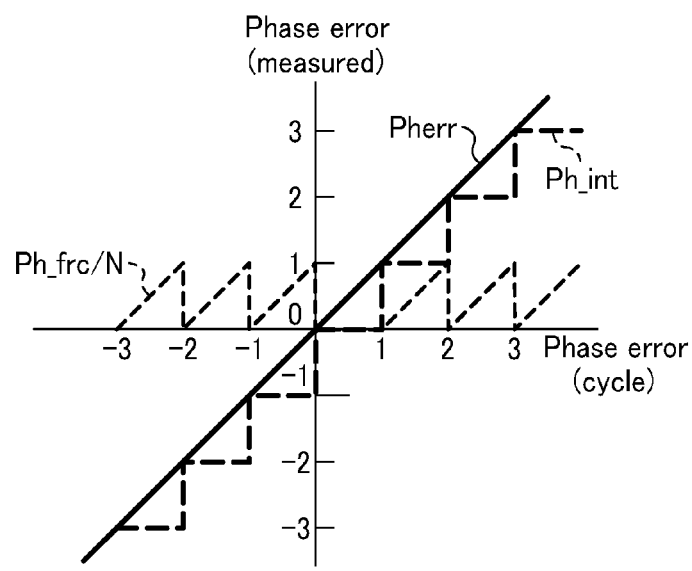
FIG. 6 is a graph illustrating relationship among the integer phase difference, a decimal fraction phase difference, and a phase difference.

FIG. 6 is a graph illustrating relationship among the integer phase difference Ph_int, the decimal fraction phase difference Ph_frc, and the phase difference Pherr. In FIG. 6, a horizontal axis indicates a true phase difference between the phase-reference pulse Refpulse and the FG pulse Fgpulse, and a vertical axis indicates a measured phase error. In both axes, 1 cycle is set to 1. A thin dashed line indicate a value Ph_frc/N that the decimal fraction phase difference Ph_frc is divided by the dividing ratio N, which shows a sawtooth wave that value circulate between 0 to 1 with respect to changing 1 phase difference. A bold solid line indicates the integer phase difference Ph_int that changes 1 with each change in the phase difference. The phase difference Pherr is obtained by adding the value Ph_frc/N and the integer phase difference Ph_int, which almost continuously changes when the dividing ratio N is sufficient great.

As described above, the motor speed controller adds the add the integer number phase difference to the decimal fraction phase difference at a predetermined ratio for output as the phase difference and controls the driving of the motor in accordance with the phase difference. Thus, the phase exceeding 1 pulse cycle, containing the decimal fraction, can be detected continuously. That is, the continuous and accurate phase difference data can be attained in an area exceeding 1 cycle. Therefore, the phase difference between a reference pulse (phase reference pulse Refpulse) and a detection pulse (FG pulse Fgpulse) can be detected over a wide range inexpensively and accurately. In addition, if the external condition fluctuates, it is small danger in that synchronized deviation occur (phases get out of sync). Therefore, the motor sped controller 120 can control the motor 107 using PLL with high degree of accuracy.

Second Embodiment

Figure 7:
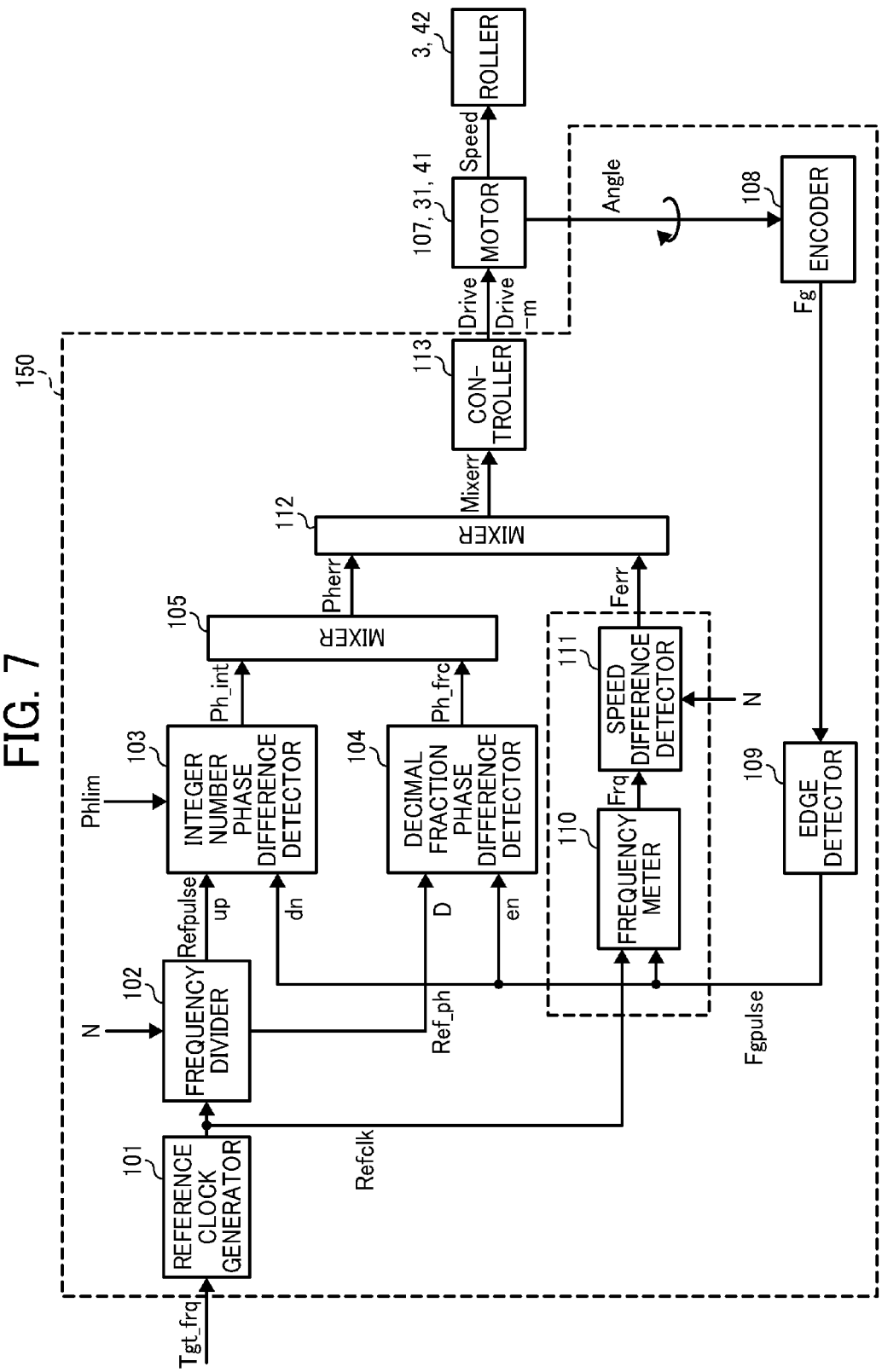
FIG. 7 is a block diagram illustrating a configuration of a motor speed controller according to a second embodiment.

FIG. 7 is a block diagram illustrating a configuration of a motor speed controller 150 according to a second embodiment. It is to be noted that, for ease of explanation and illustration, because other than the difference described below the motor speed controller 150 has a configuration similar to the configuration of the motor speed controller 120 in the first embodiment, other components of the motor speed controller 150 are represented by identical reference numerals and the description thereof is omitted below.

In FIG. 7, the difference between the motor speed controllers 150 and 120 is that the motor speed controller 150 further includes a frequency meter 110, a speed difference detector 111, and a mixer 112 in addition to the components of the motor speed controller 120, and includes a controller 113 instead of the controller 106. The frequency meter 110 measures an edge cycle of the FG pulse Fgpulse. The speed difference detector 111 sets a difference between the edge cycle and the dividing ratio N as a speed difference Perr. The mixer 112 adds the speed difference Pen and the phase difference Pherr at a predetermined ratio for output as a sum. The controller 113 controls the driving of the motor 107 based on the sum in the mixer 112.

The motor speed controller 150 can be adapted to various types of image forming apparatuses, such as copiers, facsimile machines, multifunction peripherals (MFP), and the like.

The frequency meter (cycle meter) 110 measures a cycle of the FG pulse Fgpulse using the reference clock Refclk for output as a frequency data Frq. The speed difference detector 111 subtracts the reference pulse dividing ratio N from the frequency data Frq for output as the frequency difference Ferr. The value Ferr is the amount reflected from the frequency difference between the phase-reference pulse Refpulse and the FG pulse Fgpulse. The mixer 112, serving as a second mixer, adds the phase difference Pherr to the frequency difference Ferr at a suitable ratio, for output as a mixed value (sum) Mixerr. The controller 113 outputs the motor driving amount Drive-m in accordance with the sum Mixerr.

The simplest configuration of the controller 113 is a proportional gain circuit. That is, the controller 113 generates a value proportional to "Pherr+K×Ferr (K: predetermined value) for output as the driving amount Drive-m.

With this configuration, a control loop can be stabilized by adding the speed difference Ferr, and a function of the controller 113 can be achieved by the simple proportional gain, which can control speed inexpensively and accurately. Herein, the reference diving value N used in the speed difference detector 111 can be set equal to the dividing value of the phase-reference pulse Refpulse in the frequency divider 102. Therefore, the dividing ratio in the speed difference detection and the phase difference detection can be used in common, thereby reducing cost.

Figure 8:
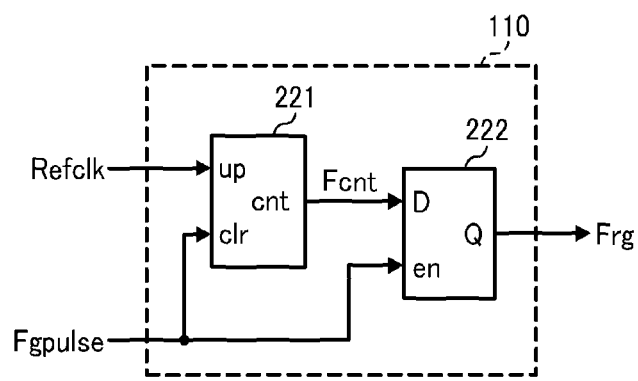
FIG. 8 is a block diagram illustrating a configuration of a frequency meter of the motor speed controller shown in FIG. 7.

FIG. 8 is a block diagram illustrating a configuration of the frequency meter (frequency detector) 110. The frequency meter 110 includes a counter 221 and a latch device 222. A count value Fcnt counted in the counter 221 is cleared when the FG pulse Fgpulse arrives and is increased when the reference clock Refclk arrives. The latch device 222 holds the count value Fcnt when the FG pulse Fgpulse arrives. The hold value in the latch device 222 is a value immediately before counting in the counter 221 is cleared. Accordingly, an arrival interval of the FG pulse Fgpulse, in other word, a cycle of the FG pulse Fgpulse is measured to output as the frequency data Frq.

Figure 9:
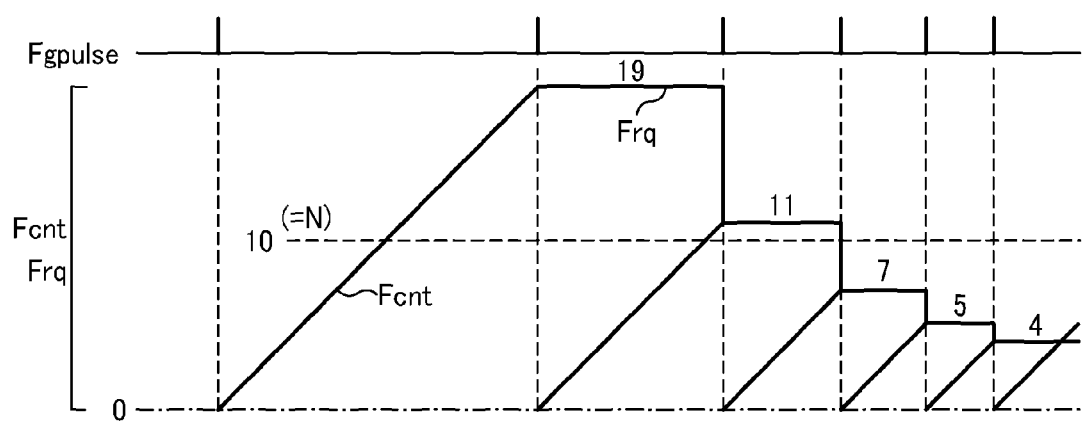
FIG. 9 is a graph illustrating operation waveforms in the frequency meter shown in FIG. 8.

FIG. 9 is a graph illustrating operation waveforms in the frequency meter 110. The reference pulse dividing value N is set to 10, similarly to FIG. 3. As is clear from FIG. 9, the interval of the phase-reference pulse Refpulse is just "10× reference clock Refclk". Thus, when the frequency of the FG pulse Fgpulse sets equal to that of the phase-reference pulse Refpulse, the frequency data frq is set 10. When the FG pulse Fgpulse is delayer than the phase-reference pulse Refpulse (when the FG pulse Fgpulse has a lower frequency and a longer cycle than the phase-reference pulse Refpulse), the frequency data Frq is greater than 10. By contrast, when the FG pulse Fgpulse is quicker than the phase-reference pulse Refpulse (when the FG pulse Fgpulse has a higher frequency and a shorter cycle than the phase-reference pulse Refpulse), the frequency data Frq is smaller than 10.

Accordingly, the value subtracted the dividing value N from the frequency data frq is used as the speed difference Ferr (Ferr=Frq−N). That is, the controller 113 controls the motor 107 so that the motor 107 drives at the target speed when the speed difference ferr is equal to 0 (ferr=0), the motor 107 speed up when the speed difference ferr is greater than 0 (ferr>0), and the motor 107 slow down the speed when the speed difference ferr is smaller than 0 (ferr<0).

As described above, similar to the first embodiment, the motor speed controller 150 adds the speed difference to the phase difference at a predetermined ratio as an additional result and controls the driving of the motor in accordance with the additional result. Thus, the phase exceeding 1 pulse cycle, containing the decimal fraction, can be detected continuously. That is, the continuous and accurate phase difference data can attained in an area exceeding 1 cycle. Therefore, the phase difference between a reference pulse (phase reference pulse Refpulse) and a detection pulse (FG pulse Fgpulse) can be detected over a wide range inexpensively and accurately. In addition, if the external condition fluctuates, it is small danger in that generation of synchronized deviation. Therefore, the motor sped controller 150 can control the motor 107 using PLL with high degree of accuracy.

(Image Forming Apparatus)

Figure 10:
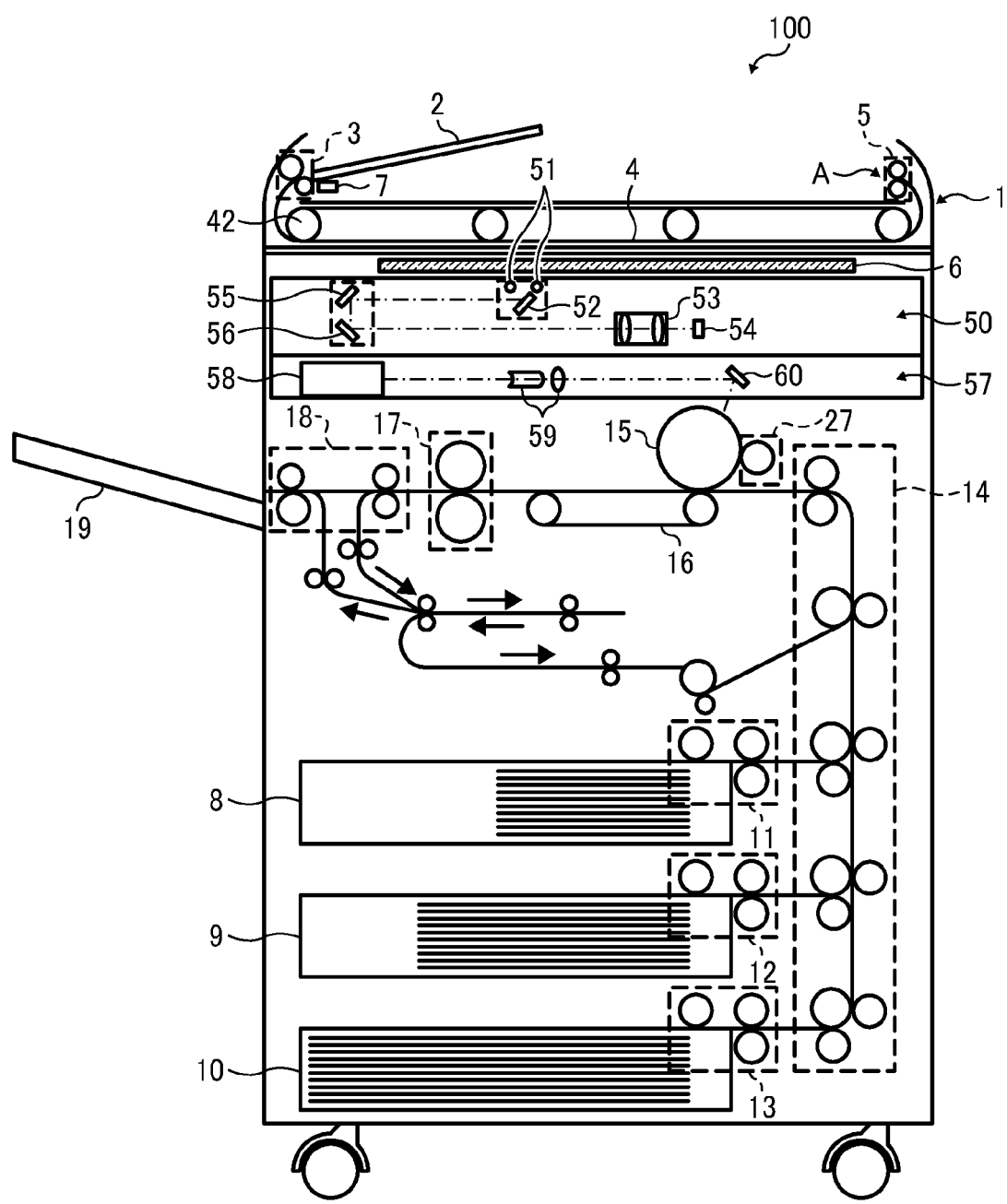
FIG. 10 is a schematic diagram illustrating an image forming apparatus incorporating the motor speed controller shown in FIG. 1 or FIG. 7.

FIG. 10 is a schematic diagram illustrating a printer 100 incorporating the above-described motor speed controller 120 (150). The printer 100 serves as an image processing device. A contact glass 6 is provided on an upper portion of the printer 100. An automatic document feeder (ADF) 1 is disposed on the top of the printer 100. The ADF 1 is connected to a main body of the printer 100 via a hinge so that the ADF can open and close the contact glass 6.

The ADF 1 includes a document tray 2 on which a stack of documents are placed, a feeding roller 3, a feeding belt 4, a feeding belt roller 5, a contact glass 6, and a document-set detector 7. The feeding roller (separation device) 3 separates the document one by one from the stack of the documents on the document tray 2. The feeding roller 3 drives the feeding belt 4. The feeding belt 4 (transport device) transports the document from the feeding roller 3 to a reading position in the contact glass 6 and then discharges the document from the contact glass 6 after the document is scanned by a scanner 50 (including exposure lamp 51, mirrors 52, 55, and 56, and lenses 53 and 54).

A feeding motor 31 (107) is controlled by an output signal from motor speed controller 120 (see FIG. 1). When a feeding start signal is input from the printer 100, the motor speed controller 120 drives the feeding motor 31 so that the feeding roller 3 normally rotates and then reverse rotates. When the feeding motor 31 normally drives, the feeding roller 3 rotates clockwise to pick up the top document on the stack of the documents. Then, the document (present document) is transported to the contact glass 6. Then, when the document-set detector 7 detects a leading edge of the present document, the motor speed controller 120 drives the feeding motor 107 to reversely rotate based on an output signal from the document-set detector 7, which prevents a following sheet from being fed from the stack of the documents and being transported and entered to the contact glass 6.

Subsequently, when the document-set detector 7 detects a trailing edge of the present document, the motor speed controller 120 starts counting a rotary pulse of a belt-feeding motor 41 (107) connected to a feeding belt roller 42. Then, when the rotary pulse reaches a predetermined value, the motor speed controller 120 stops rotating the feeding belt roller 42 to stop the feeding belt 4, and accordingly, the document is stopped on the reading position in the contact glass 6.

Along with these processes, when the document-set detector 7 detects the trailing edge of the document, the motor speed controller 120 drives the feeding motor 41 again to pick the following document from the stack thereof and then transport it to the contact glass 6. Then, during a time period from when the document-set detector 7 detects the leading edge of the document to when the rotary pulse in the feeding motor 41 reaches the predetermined pulse, the following document is stand by state on the way to the contact glass 6.

Then, when the document is stopped on the reading position in the contact glass 6, the document is scanned (read) and exposed by the scanner 50 in the printer 100. After the scanning and exposure are finished, a signal from the printer 100 is input to the motor speed controller 120. When the signal is input, the motor speed controller 120 drives the feeding belt motor 41 that normally rotates the feeding belt roller 42 so that the feeding belt 4 discharges the document from the contact glass 6 to a discharge roller 5.

Herein, when a print key on an control panel in the image forming apparatus is pushed, a top of the stack of the document laid on the document tray 2 in the ADF 1 in a state in which the image surface of the document faces upward is separated and is transported to the scanning portion on the contact glass 6. After the image data on the document positioned on the contact glass 6 is read by the scanning unit 50, the document is discharged to a discharge opening A (a discharge opening to which the reverse document is discharged) by the feeding belt 4 and a reverse driving roller. Then, when the presence of the following document on the document tray 2 is detected by the document-set detector 7, the following document is transported to the contact glass 6, similarly to the previous document (present document).

A transfer sheet stacked on one of a first tray 8, a second tray 9, and a third tray 10 is fed by one of a first feeding unit 11, a second feeding unit 12, and a third feeding unit 13. Then, the transfer sheet is transported to a portion facing a photoreceptor 15 by a vertical transport unit 14. The image data scanned by the scanning unit 50 is written to the photoreceptor 15 by a laser from a writing unit 57, and then the toner image is formed while the image data passes through a developing unit 27. Subsequently, while the transfer sheet is transported by a transfer belt 16 at a same velocity to the rotary velocity of the photoreceptor 15, the toner image on the photoreceptor 15 is transferred on the transfer sheet. Subsequently, the image is fixed on the transfer sheet in a fixing unit 17, and the transfer sheet is transported to a discharge unit 18. When the transfer sheet is not stapled, the transfer sheet transported in the discharge unit 18 is discharged to a discharge tray 19.

It is to be noted that the configuration of the present specification is not limited to that shown in FIG. 10. For example, the configuration of the present specification may be adapted to printers including an electrophotographic image forming device as well as other types of image forming apparatuses, such as copiers, facsimile machines, multifunction peripherals (MFP), and the like.

Numerous additional modifications and variations are possible in light of the above teachings. It is therefore to be understood that, within the scope of the appended claims, the disclosure of this patent specification may be practiced otherwise than as specifically described herein.

What is claimed is:

1. A motor speed controller to control a motor speed, comprising:
    a reference clock generator to generate a reference clock based on a reference frequency signal;
    a phase reference pulse generator to divide frequency of the reference clock by a dividing ratio N for output as a phase-reference pulse;
    an encoder to output a frequency generator (FG) signal at a predetermined rotational angle of the motor;
    an edge detector to detect an edge of the FG signal for output as a FG pulse;
    an integer phase difference detector to detect a difference between the number of phase-reference pulses and the number of FG pulses for output as an integer phase difference;
    a decimal fraction phase difference detector to detect a time difference between an edge of the phase-reference pulse and the edge of the FG edge pulse in units of the reference clock for output as a decimal fraction phase difference;
    a mixer to add the integer phase difference to the decimal fraction phase difference at a predetermined ratio for output as a phase difference; and
    a controller to control driving of the motor based on the phase difference output from the mixer.

2. The motor speed controller according to claim 1, wherein the integer number phase difference detector comprises an up-down counter to increase a count value based on the edge of the phase-reference pulse and decrease the count value based on the edge of the PG pulse.

3. The motor speed controller according to claim 2, wherein the up-down counter comprises a limiter to prevent the count value in the up-down counter from exceeding a predetermined upper limit and a predetermined lower limit.

4. The motor speed controller according to claim 1, wherein the integer number phase difference detector comprises an up-down counter to decrease a count value based on the edge of the phase-reference pulse and increase the count value based on the edge of the PG pulse.

5. The motor speed controller according to claim 4, wherein, the up-down counter comprises a limiter to prevent the count value in the up-down counter from exceeding a predetermined upper limit and a predetermined lower limit.

6. The motor speed controller according to claim 1, wherein the controller uses the dividing value N from the phase reference pulse generator to add the integer number phase difference to N times the decimal fraction phase difference for generating the phase difference.

7. The motor speed controller according to claim 1, further comprising:
    a cycle meter to measure edge cycle of the FG pulse in units of the reference clock;
    a speed difference detector to detect a difference between the edge cycle and the dividing ratio N as a speed difference; and
    a second mixer to add the speed difference to the phase difference at a predetermined ratio for output as a sum, wherein the controller controls the driving of the motor in accordance with the sum output from the second mixer.

8. The motor speed controller according to claim 1, wherein the decimal fraction phase difference detector is a latch circuit.

9. A speed control method for controlling speed of a motor, comprising:
    generating a reference clock based on a reference frequency signal;
    generating a phase-reference pulse to divide the reference clock;
    generating a FG pulse per rotary angle of the motor;
    detecting a difference between the number of phase-reference pulses and the number of FG pulses as an integer number phase difference;
    detecting a time difference between an edge of the phase-reference pulse and an edge of the FG pulse in units of the reference clock for output as a decimal fraction phase difference;
    adding the integer number phase difference to the decimal fraction phase difference for output as a phase difference; and
    controlling driving of the motor in accordance with the phase difference.

10. The speed control method according to claim 9, further comprising:
    measuring edge cycle of the FG pulse in units of the reference clock;
    detecting a difference between the edge cycle and the dividing ratio N for output as a speed difference;
    adding the speed difference to the phase difference at a predetermined ratio for output as a sum; and
    controlling the driving of the motor in accordance with the sum obtained by adding the speed difference to the phase difference at a predetermined ratio.

* * * * *